(12) United States Patent
Djikpesse et al.

(10) Patent No.: US 9,720,130 B2
(45) Date of Patent: Aug. 1, 2017

(54) GUIDED BAYESIAN EXPERIMENTAL DESIGN

(71) Applicant: SCHLUMBERGER TECHNOLOGY CORPORATION, Sugar Land, TX (US)

(72) Inventors: Hugues A. Djikpesse, Cambridge, MA (US); Mohamed-Rabigh Khodja, Quincy, MA (US); Michael David Prange, Somerville, MA (US)

(73) Assignee: SCHLUMBERGER TECHNOLOGY CORPORATION, Cambridge, MA (US)

( * ) Notice: Subject to any disclaimer, the term of this patent is extended or adjusted under 35 U.S.C. 154(b) by 925 days.

(21) Appl. No.: 14/083,368

(22) Filed: Nov. 18, 2013

(65) Prior Publication Data

US 2014/0081575 A1    Mar. 20, 2014

Related U.S. Application Data

(63) Continuation of application No. 12/507,536, filed on Jul. 22, 2009, now Pat. No. 8,589,078.

(51) Int. Cl.
| | | |
|---|---|---|
| *G01V 11/00* | (2006.01) | |
| *G01V 99/00* | (2009.01) | |
| *G06F 17/18* | (2006.01) | |

(52) U.S. Cl.
CPC .............. *G01V 11/00* (2013.01); *G01V 99/00* (2013.01); *G06F 17/18* (2013.01)

(58) Field of Classification Search
CPC .......... G01V 99/00; G01V 11/00; G06F 17/18
See application file for complete search history.

(56) References Cited

U.S. PATENT DOCUMENTS

| | | | |
|---|---|---|---|
| 6,618,676 | B2 | 9/2003 | Kriegshauser et al. |
| 7,286,939 | B2 | 10/2007 | Bachrach et al. |
| 7,299,131 | B2 | 11/2007 | Tabarovsky et al. |
| 8,589,078 | B2 | 11/2013 | Djikpesse et al. |
| 2002/0183930 | A1 | 12/2002 | Plona et al. |
| 2007/0168133 | A1 | 7/2007 | Bennett et al. |
| 2009/0164186 | A1 | 6/2009 | Haase et al. |
| 2009/0228516 | A1 | 9/2009 | Liu et al. |
| 2011/0011595 | A1* | 1/2011 | Huang .................... E21B 43/00 166/369 |

OTHER PUBLICATIONS

Richard DeLoach, "Bayesian Inference in the Modern Design of Experiments", Jan. 2008 46th AIAA Aerospace Sciences Meeting and Exhibit; Jan. 7-10, 2008; Reno, NV.*

Ying Zhang, "Bayesian D-Optimal Design for Generalized Linear Models", PhD Thesis Dec 2007 Virginia Polytechnic Institute and State University.*

(Continued)

*Primary Examiner* — Regis Betsch

(57) ABSTRACT

A Bayesian methodology is described for designing experiments or surveys that are improved by utilizing available prior information to guide the design toward maximally reducing posterior uncertainties in the interpretation of the future experiment. Synthetic geophysical tomography examples are used to illustrate benefits of this approach.

13 Claims, 8 Drawing Sheets

(56) References Cited

OTHER PUBLICATIONS

Rafael L. Bras, "The South Florida Water Management Model, Version 5.5", Final Peer Review Report Oct. 2005.*
Jonas Sjöblom, "Latent variable projections of sensitivity data for experimental screening and kinetic modeling", Available online May 24, 2008, Computers and Chemical Engineering 32 (2008) 3121-3129.*
Hamby, et al., "Optimal design of experiments for control: a preposterior viewpoint", Proceedings of the American Control Conference, vol. 5, 1999; pp. 3446-3450.
Iturbe, et al., "Shallow-Water Acoustic Tomography Performed From a Double-Beamforming Algorithm: Simulation Results", IEEE Journal of Oceanic Engineering, vol. 34 (2), Apr. 2009; pp. 140-149.
Optimum Experimental Design, "A Simple Introduction to Optimal Designs and Related Issues", Retrieved from http://optimal-design.biostat.ucla.edu/optimal/OptimalOverview.aspx, Retrieved on Jul. 29, 2014; 2 pages.

* cited by examiner

GUIDED BAYESIAN EXPERIMENTAL DESIGN

CROSS-REFERENCE TO RELATED APPLICATION

This application is a continuation application of U.S. patent application Ser. No. 12/507,536, filed Jul. 22, 2009, entitled "GUIDED BAYESIAN EXPERIMENTAL DESIGN," which has issued as U.S. Pat. No. 8,589,078 on Nov. 19, 2013. Both the patent application and the issued patent are incorporated by reference herein.

FIELD OF THE INVENTION

This invention is generally related to experimental designs, and more particularly to utilizing prior information to reduce posterior uncertainties when designing and controlling experiments performed to analyze subterranean formations.

BACKGROUND OF THE INVENTION

Various on-site experiments are performed in the course of locating and recovering subterranean hydrocarbon resources. Such experiments include, but are not limited to, seismic and acoustic surveys. Seismic surveys characterize a formation based on measurements of properties of waves propagated through the formation. Typically, elastic waves such as compressional, shear and Stoneley waves are established by mechanical disturbances. Measurements of properties such as velocity (or its reciprocal, slowness) in the formation and in a borehole can help in evaluation and production of hydrocarbon resources. The results of such experiments are dependent upon various factors, such as positioning of wave source and receivers, and wave characteristics. It is generally desirable to have a well designed experiment in order to efficiently obtain desired data without excessive experiment modification.

The field of optimal experimental designs (OED) can help to design experiments for effective data collection when, for instance, acquisition time, acquisition costs and high data quality are of concern. Although it originated as a discipline of statistics, OED now has applications, in physics, biology, geophysics, sociology and pharmaceutics. In the geophysical sciences, OED has been considered in contexts including oceanographic acoustic tomography, electromagnetic soundings, seismic tomography, seismic amplitude versus offset, microseismic monitoring and resistivity measurements. Consider the possibly nonlinear forward problem, $$d = g(m; p), \quad (1)$$

where d is an N-dimensional vector of data predicted from a model given by the M-dimensional model vector m, and P-dimensional vector p represents the control parameters. The Bayesian inverse problem comprises finding the optimal estimate of m, along with its uncertainty, that is consistent with noisy measurements. In contrast to the inverse problem, in which parameters are estimated from measurements, OED seeks to predict which experimental design, p, will yield the best estimate of model parameters from measurements to be collected in the future. In a Bayesian inverse problem, the solution is expressed as a probability density function of m conditional on the measurements and the control parameters. It is expressed using Bayes' rule in the following form:

$$\pi(m|d,p) \propto \pi(d|m,p)\pi(m), \quad (2)$$

where $\pi(m|d,p)$ is the posterior probability density, $\pi(d|m,p)$ is the likelihood function, and $\pi(m)$ is the prior probability density. The likelihood function measures the fitness of the predicted data relative to the noisy measurements. The prior probability density describes information available about the model before collecting the measurements. If the model can be linearized around a reference model $m_0$ and both the observation noise and the prior can be assumed to be multinormal, the posterior is also multinormal. If the prior and/or observation noise are not multinormal, a transformation can be applied to make them multinormal (S. Houlding, "Practical Geostatistics: Modeling and Spatial Analysis," Springer, 2000). Linearizing Eq. 1 about $m_0$ yields:

$$d = Gm, \quad (3)$$

where G is the N×M sensitivity matrix defined by $G_{ij} = [\partial g_i/\partial m_j]_{m=m_0}$. The likelihood function then has the form $$\pi(d \mid m, p) \propto \exp\left[-\frac{1}{2}(d_{obs} - Gm)^T C_D^{-1}(d_{obs} - Gm)\right], \quad (4)$$

where $d_{obs} = d + \epsilon$ is a vector of noisy measurements and $\epsilon$ represents the noise associated with the observations. This noise is assumed multinormal with zero mean and covariance $C_D$. The prior model probability density is defined by $$\pi(m) \propto \exp\left[-\frac{1}{2}(m - m_{prior})^T C_M^{-1}(m - m_{prior})\right], \quad (5)$$

where $m_{prior}$ is the available mean a priori model and $C_M$ is the covariance describing the uncertainty around $m_{prior}$. The multinormal posterior probability density, from Eq. 2, is given by $$\pi(m \mid d, p) \propto \exp\left[-\frac{1}{2}(m - \tilde{m})^T \tilde{C}_M^{-1}(m - \tilde{m})\right], \quad (6)$$

with mean and posterior covariance $$\tilde{m} = m_{prior} + C_M G^T (GC_M G^T + C_D)^{-1}(d_{obs} - Gm_{prior}) \quad (7)$$

and $$\tilde{C}_M = (G^T C_D^{-1} G + C_M^{-1})^{-1}. \quad (8)$$

K. Smith, "On the standard deviations of adjusted and interpolated values of an observed polynomial functions and its constants and the guidance they give towards a proper choice of the distribution of observations," *Biometrika*, 12:1-85, 1918, may be the earliest work on optimal design. Smith introduced an optimality criterion which effectively seeks to minimize the maximum variance in the predicted values by minimizing the determinant of the matrix $G^T(G^T G)^{-1}G$. This corresponds to minimizing the determinant of the posterior data covariance matrix $\tilde{C}_D = G^T \tilde{C}_M G$ when assuming that there is no prior information ($C_M^{-1} = 0$) and $C_D \propto I$ (data uncertainties are assumed not correlated among samples and statistically invariant). A. Wald, "On the efficient design of statistical investigations," *Ann. Math. Stat.*, 14:134-140, 1943, suggests another optimality criterion that effectively seeks to minimize the volume of the confidence ellipsoid of the model parameters by minimizing the determinant of the matrix $G^T G$. This corresponds to minimizing the determinant of the posterior model covariance matrix $C_M$ when assuming, again, that $C_M^{-1}=0$ and $C_D \propto I$. J. Kiefer and J. Wolfowitz, "Optimum design in regression problems," *Ann. Math. Stat.*, 30:271-294, 1959, introduced the concept of an approximate design and the alphabetic classification of optimality criteria. The minimization of $G^T G$ is called the D-optimality criterion in this classification. Since those early works, several authors have proposed other optimality criteria. However, most of the OED algorithms proposed in these works are computationally expensive. They employ essentially global optimization algorithms (simulated annealing, genetic algorithms, etc.) when considering nonlinear systems and whole matrix inversion when considering linear systems.

A more computationally efficient method suggested by O. Dykstra, "The augmentation of experimental data to maximize —X'X—," *Technometrics*, 13(3):682-688, 1971, and more recently by Darrel Coles, "*Optimal Experimental Design Applied to DC Resistivity Problem*," PhD thesis, Massachusetts Institute of Technology, 2008, is based on a greedy algorithm. Let $G=[g_1^T g_2^T \ldots g_X^T]^T$ be the sensitivity matrix whose rows, $g_i^T$, are the sensitivity kernels of the candidate observations. Define $\mathcal{X}$ as the index set of all of the candidate observations to be considered in the design problem. Out of this set, which could possibly be very large, select a subset of observations that constitutes an optimal design. This is a multivariate global optimization problem that is expensive to compute. In Coles' greedy approach, this is reduced to a univariate optimization problem in which a single best observation is sought that is optimal when added to an already selected base experiment. Iterating this approach, this sequence of locally optimal solutions yields a final solution that, while not guaranteed to be globally optimal, is typically of high quality and is much faster to compute than the global optimization problem. Let $G_n$ be the n×M sensitivity matrix of the base experiment, whose rows correspond to the observations chosen so far from the rows of G. Let $g_{n+1}^T$ be a row of G corresponding to a candidate observation. Thus, at step n+1, the sensitivity matrix of the experiment under consideration is given by the block matrix $$G_{n+1} = \begin{bmatrix} G_n \\ g_{n+1}^T \end{bmatrix}. \tag{9}$$

Using a D-optimality criterion, $g_{n+1}$ is chosen to maximize $$\frac{|G_{n+1}^T (C_D^{-1})_{n+1} G_{n+1}|}{|G_n^T (C_D^{-1})_n G_n|}. \tag{10}$$

A ratio of determinants is used here in order to emphasize that the greedy optimization step at n+1 is with respect to the fixed base experiment at step n. Note that the D-optimality criterion has be augmented to have the form $G^T C_D^{-1} G$ to allow it to account for anticipated measurement uncertainty in keeping with the likelihood term in Eq. 8. Using rank-one update formulas and the assumption that $C_D$ is a diagonal matrix whose n-th diagonal entry is $\sigma_n^2$, this ratio simplifies to $$\frac{|G_{n+1}^T (C_D^{-1})_{n+1} G_{n+1}|}{|G_n^T (C_D^{-1})_n G_n|} = 1 + \sigma_{n+1}^{-2} g_{n+1}^T (G_n^T G_n)^{-1} g_{n+1}. \tag{11}$$

Coles showed that the $g_{n+1}$ that satisfies this maximization problem is maximally orthogonal to the rows of $G_n$, and takes advantage of this property to propose an efficient algorithm built on Gram-Schmidt orthogonalization (G. H. Golub and C. F. Van Loan. *Matrix Computations.* Johns Hopkins, Baltimore, Md., USA, 1996). This use of orthogonality is a refinement of the greedy D-optimality approach originally suggested by P. A. K. Covey-Crump and S. D. Silvey, "Optimal regression designs with previous observations," *Biometrika*, 57(3):551-566, 1970 and O. Dykstra, "The augmentation of experimental data to maximize —X'X—," *Technometrics*, 13(3):682-688, 1971. By using the D-optimality criterion, these approaches assume there is no prior information ($C_M^{-1}=0$) and that observation noise is uncorrelated among samples.

SUMMARY OF THE INVENTION

Embodiments of the present invention are predicated on recognition that the techniques described in OED literature are characterized by a restrictive assumption of no prior information, i.e., $C_M^{-1}=0$. The present invention reduces the uncertainty in the estimate of m. More particularly, embodiments of the invention reduce or minimize the uncertainty expressed by $C_M$ by maximizing the determinant $|C_M^{-1}|$.

In accordance with an embodiment of the invention, a method for designing an experiment comprises: selecting a plurality of physical model parameters; selecting candidate physical observations of interest; calculating a sensitivity matrix for the physical model parameters and candidate observations; utilizing the sensitivity matrix and prior information descriptive of at least some of the physical model parameters to calculate a set of physical observations from the candidate physical observations of interest that best resolve the physical model parameters; and outputting the calculated set of physical observations in tangible form.

In accordance with another embodiment of the invention, apparatus for characterizing a subterranean formation comprises: at least one sensor for obtaining physical observations which characterize the formation; a memory including prior information descriptive of at least some physical model parameters; and a processor which runs a program to: calculate a sensitivity matrix for selected physical model parameters and candidate observations; and utilize the sensitivity matrix and prior information descriptive of at least some of the physical model parameters to calculate a set of physical observations from the candidate physical observations of interest that best resolve the physical model parameters; and the calculated set of physical observations being utilized to configure the at least one sensor.

Embodiments of the invention advantageously improve experiments or surveys by utilizing available prior information to guide the design toward reducing posterior uncertainties in the interpretation of the future experiment. Applications of a generalized Bayesian D-optimality approach include i) optimal experiment design when prior information exists prior to collecting observations, ii) real-time optimal survey design using information provided by the already collected observation to refine or improve the acquisition process and iii) interpretation of a survey for quality-control purposes at the field site by using OED to select a subset of the survey for faster processing.

DETAILED DESCRIPTION

Figure 1:
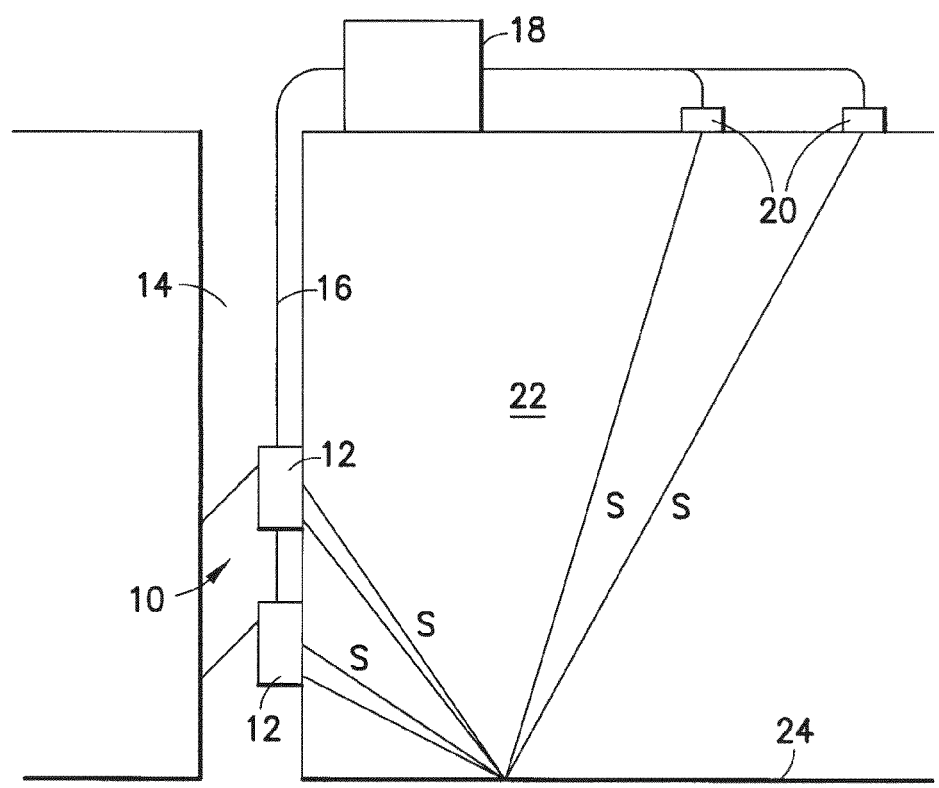
FIG. 1 illustrates a general arrangement of a vertical seismic profile (VSP) survey.

A general arrangement of a vertical seismic profile (VSP) survey is shown in FIG. 1. A tool 10, typically including and array of seismic receivers 12, e.g., geophones, is positioned in a borehole 14 by means of a logging cable 16 connected to surface equipment 18. One or more seismic sources 20, e.g., airguns, are positioned at the surface some distance from the borehole 14. When the sources are fired, seismic waves S travel through the formation 22 surrounding the borehole 14 and are reflected in part from changes in acoustic impedance in the formation due to the presence of bed boundaries 24, and are detected by the receivers 12 in the borehole 14. The signals recorded from the receivers 12 can be interpreted by use of a suitable geophysical model to characterize the formation 22, e.g., in terms of the shape and location of the boundary 24. Often, the VSP survey is designed with the intention of investigating a particular area or target within a roughly known boundary. Variations of such surveys can include reverse VSP (sources in borehole, receivers at the surface), walkaway VSP (measurements made from a series of source firing as it is moved progressively further from the borehole), 3D VSP (use of a 2D array of sources at the surface), and drill bit seismic (drill bit as source of signals, receivers at the surface). The surface equipment may include a memory with prior information regarding the target and a computer program for performing guided Bayesian experimental design. The location, number and type of receivers and sources used in a given test are some factors that may be selected and controlled based on guided Bayesian experimental design.

Figure 2:
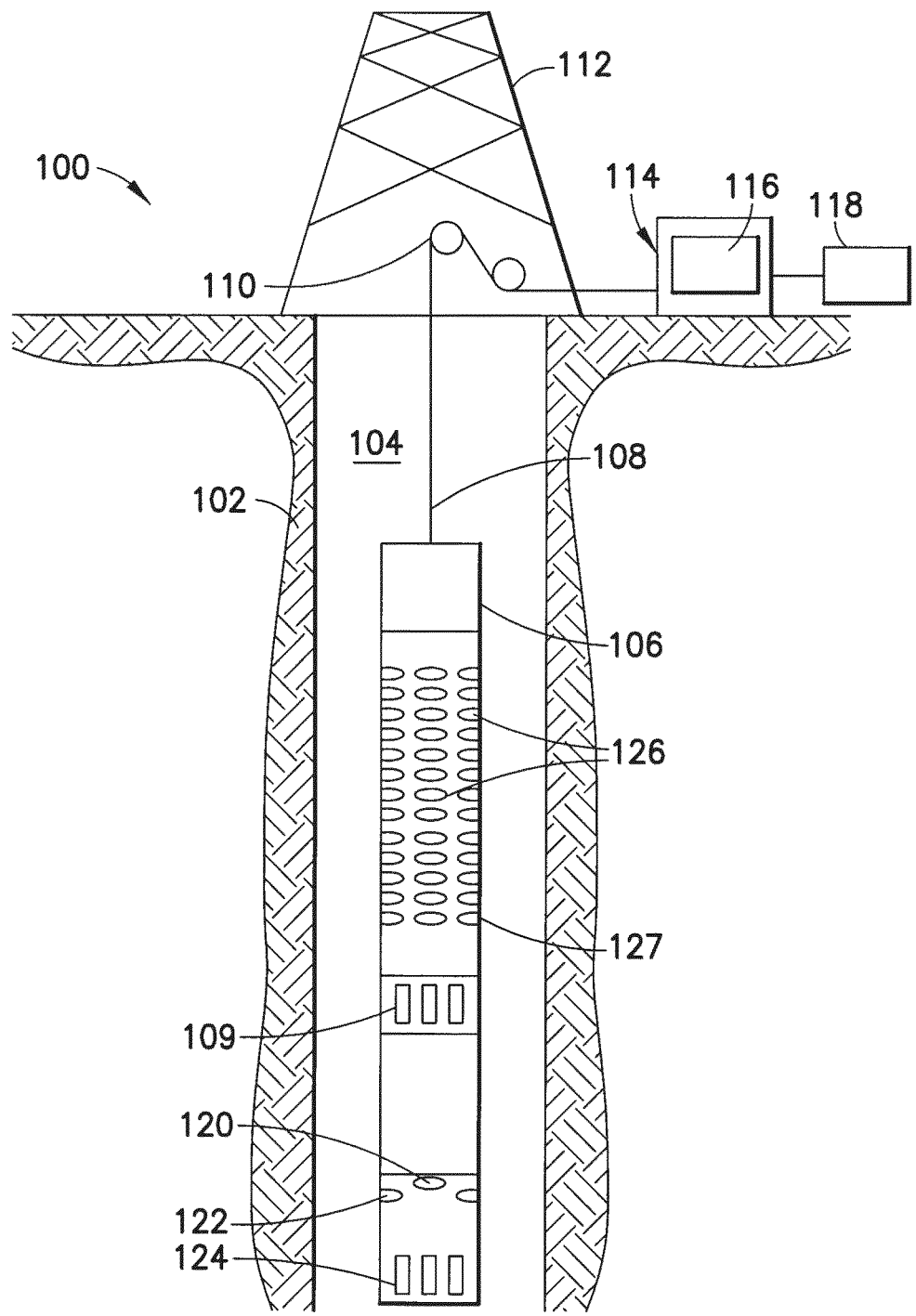
FIG. 2 illustrates an acoustic logging tool for estimating formation stresses using radial profiles of three shear moduli.

FIG. 2 illustrates a general arrangement of a logging tool (106) used to acquire and analyze sonic data that describes a subterranean formation. The illustrated tool has a plurality of acoustic receivers and transmitters, including multi-pole transmitters such as crossed dipole transmitters (120, 122) (only one end of dipole (120) is visible in the figure) and monopole transmitters (109) (close) and (124) (far) capable of exciting compressional, shear, Stoneley, and flexural waves. The logging tool (106) also includes receivers (126), which are spaced apart some distance from the transmitters. The logging tool (106) is suspended from an armored cable (108) and may have optional centralizers (not shown). The cable (108) extends from the borehole (104) over a sheave wheel (110) on a derrick (112) to a winch forming part of surface equipment, which may include an analyzer unit (114). Well known depth gauging equipment (not shown) may be provided to measure cable displacement over the sheave wheel (110). The tool (106) may include any of many well known devices to produce a signal indicating tool orientation. Processing and interface circuitry within the tool (106) amplifies, samples and digitizes the tool's information signals for transmission and communicates them to the analyzer unit (114) via the cable (108). Electrical power and control signals for coordinating operation of the tool (106) may be generated by the analyzer unit (114) or some other device, and communicated via the cable (108) to circuitry provided within the tool (106). The surface equipment includes a processor subsystem (116) (which may include a microprocessor, computer readable memory, clock and timing, and input/output functions—not separately shown), standard peripheral equipment (not separately shown), and a recorder (118). The memory may include prior information regarding the formation and a computer program for performing guided Bayesian experimental design. The location, number and type of receivers and transmitters used in a given test are some factors that may be selected and controlled based on guided Bayesian experimental design.

Figure 3:
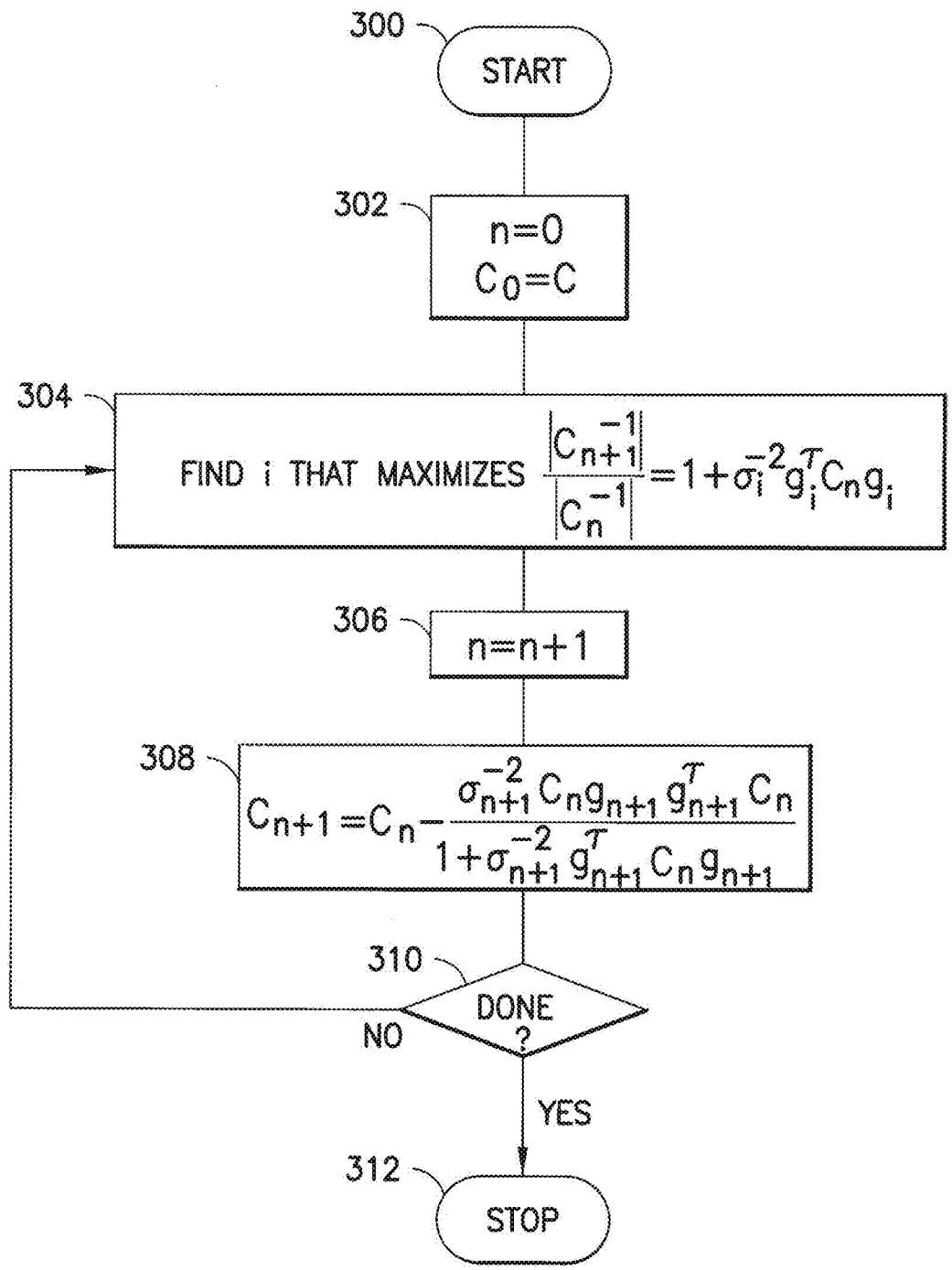
FIG. 3 is a flow diagram of an embodiment of guided Bayesian experimental design.

FIG. 3 is a flow diagram of a guided Bayesian experimental design algorithm for designing experiments including but not limited to seismic and acoustic surveys. In order to start 300, the relevant physical model parameters are first selected and assigned to m. Further, the relevant candidate physical observations of interest are selected. Further, the available prior information on model parameters and observation noise is characterized in the form of: a prior mean model; a prior covariance matrix C describing the uncertainty around the prior mean model; and a covariance matrix $C_D$ describing the uncertainty around the anticipated zero-mean observation noise. A sensitivity matrix G is then computed for these model parameters and candidate observations, e.g., using a blackbox simulator. In the case of observations with single measurements and uncorrelated noise, the following conditions are set as indicated by step 302: n=0; $C_0$=C. Then, in step 304, find $g_1$ that maximizes $$\frac{|C_1^{-1}|}{|C_0^{-1}|} = 1 + \sigma_1^{-2} g_1^T C_0 g_1.$$

In step 306, n is incremented. Then, for n=1, $$C_1 = C_0 - \frac{\sigma_1^{-2} C_0 g_1 g_1^T C_0}{1 + \sigma_1^{-2} g_1^T C_0 g_1}$$

as indicated by step 308. Steps 304, 306 and 308 are repeated until convergence as determined in step 310. For example, in a subsequent iteration for n=1, find $g_2$ that maximizes $$\left|\frac{C_2^{-1}}{C_1^{-1}}\right| = 1 + \sigma_1^{-2}g_2^T C_1 g_2,$$

and then for n=2, $$C_2 = C_1 - \frac{\sigma_2^{-2}C_1 g_2 g_2^T C_1}{1 + \sigma_2^{-2}g_2^T C_1 g_2},$$

and find $g_3$ that maximizes $$\left|\frac{C_3^{-1}}{C_2^{-1}}\right| = 1 + \sigma_3^{-2}g_3^T C_2 g_3$$

Examples of stop 312 conditions include: adding a new observation to the experiment no longer results in significant improvement in $|C_{n+1}^{-1}|/|C_n^{-1}|$; when the number of added measurements exceeds the total number of model parameters; and when the number of added measurements exceeds a predefined maximum number. After completion, the optimal design is the set of observations that would maximally impact the resolution of the model parameters given the information available on the model parameters and the anticipated observation noise prior to collecting the measurement.

In view of the description above, it will be appreciated that the algorithm is advantageously generic in the sense that it can be applied with any physical measurement or observation, i.e., it is not limited to seismic and acoustic surveys. However, at least with regard to seismic and acoustic surveys the algorithm provides the advantage of utilizing prior model information which often exists but might not otherwise be used. For instance, in geophysical tomography, the prior mean model and associated covariance matrix could come from surface seismic data interpretation when one is considering 3D vertical seismic profile acquisition to refine a particular area of the subsurface model. When one is performing a real-time survey design, the prior information on the model could come from the interpretation of the already acquired measurements.

It should be noted that although the algorithm has been described for the case of single measurement observations and uncorrelated noise, it is also applicable when considering observations with multiple measurements and correlated noise by changing the function to maximize for finding $g_n$ and by changing the formula used to update the base experiment matrix $C_n$. In the case where each observation may be associated with multiple measurements, the observation selection algorithm considers k measurements at a time for an observation with k associated measurements. To compare the numerical advantage of performing one-time rank-k updates versus over performing k consecutive rank-one updates, let $$\Gamma = [\Gamma_1 \Gamma_2 \ldots \Gamma_k]^T \quad (26)$$

be the matrix whose rows $\Gamma_i$, $1 \leq i \leq k$, are the sensitivity kernels of the relevant data stations. For a diagonal data covariance matrix, i.e., for $$(C_D)_{n+k} = \begin{bmatrix} (C_D)_n & 0 \\ 0 & S \end{bmatrix}, \quad (27)$$

wherein $$S = \begin{bmatrix} \sigma_1^2 & 0 & \ldots & 0 \\ 0 & \sigma_2^2 & \ldots & 0 \\ \vdots & \vdots & \ddots & \vdots \\ 0 & 0 & \ldots & \sigma_k^2 \end{bmatrix}. \quad (28)$$

It follows that for a one-time rank-k augmentation $$C_{n+k}^{-1} = C_n^{-1} + \Gamma^T S \Gamma, \quad (29)$$

from which it is straightforward show that $$\left|\frac{C_{n+k}^{-1}}{C_n^{-1}}\right| = |S|^{-1}|S + \Gamma C_n \Gamma^T|. \quad (30)$$

This expression reduces for k=2 to $$\left|\frac{C_{n+2}^{-1}}{C_n^{-1}}\right| = \sigma_1^{-2}\sigma_2^{-2} \left\| \begin{matrix} \sigma_1^2 + \Gamma_1^T C_n \Gamma_1 & \Gamma_1^T C_n \Gamma_2 \\ \Gamma_2^T C_n \Gamma_1 & \sigma_2^2 + \Gamma_2^T C_n \Gamma_2 \end{matrix} \right\| \quad (31)$$

$$= (1 + \sigma_1^{-2}\Gamma_1^T C_n \Gamma_1)(1 + \sigma_2^{-2}\Gamma_2^T C_n \Gamma_2) -$$

$$\sigma_1^{-2}\sigma_2^{-2}\|\Gamma_1^T C_n \Gamma_2\|^2. \quad (32)$$

Examining the operations count for a one-time rank-k augmentation one has to sum the operations occurring in four computation steps:
1. The product of a typically large M×M matrix with a M×k matrix requires M×M×k multiplications and M×k×(M−1) additions. This step requires $O(M^2 k)$ operations.
2. The product of a k×M matrix by a M×k matrix requires k×k×M multiplications and k×k×(M−1) additions. This requires $O(k^2 M)$ operations.
3. The determinant of a typically small k×k matrix requires $O(k^3)$ operations.
4. The product of k+1 scalars requires $O(k)$ operations.

Therefore the total cost of this one-time rank-k augmentation procedure is $$O(M^2 k) + O(k^2 M) + O(k^3) + O(k) \approx O(M^2 k) \text{ for } k << M. \quad (33)$$

Now, for k consecutive rank-one updates $$C_{n+k}^{-1} = C_n^{-1} + \sum_{l=1}^{k} \sigma_l^{-2} \Gamma_l \Gamma_l^T. \quad (34)$$

An analytic expression $|C_{n+k}^{-1}|/|C_n^{-1}|$ for a given k, is $$\left|\frac{C_{n+k}^{-1}}{C_n^{-1}}\right| = \prod_{l=1}^{k} (1 + \sigma_{k-l+1}^{-2} \Gamma_{k-l+1} \Lambda_{k-l}^{-1} \Gamma_{k-l+1}^T). \quad (35)$$

where $$\Lambda_{k-l} \equiv C_n^{-1} + \sum_{l=1}^{k-l} \sigma_r^{-2} \Gamma_r \Gamma_r^T. \quad (36)$$

The explicit form of Eq. 35 for an arbitrary k is somewhat cumbersome, but for k=2 it can be seen that it is identical to Eq. 32. Examining the operations count for k consecutive rank-one updates, one has to perform $k(M^2+M+2)+k$ multiplications and $k(M(M-1)+(M-1)+1)$ additions, yielding the operations count estimate $$O(M^2k) \text{ for } k \ll M. \tag{37}$$

Comparing the operations counts for both update approaches, there is no advantage to using one over the other. However, in comparing the implementation complexity of Eq. 35 versus Eq. 30, one might prefer the simplicity of the former over the latter.

In the most general case the data covariance matrix, $C_D$, is a symmetric, positive definite matrix; it is conveniently written in block form as $$(C_D)_{n+1} = \begin{bmatrix} (C_D)_n & c_{n+1} \\ c_{n+1}^T & \sigma_{n+1}^2 \end{bmatrix} \tag{38}$$

wherein $(C_D)_n$ is the covariance matrix of the base experiment data, $\sigma_{n+1}^2$ is the variance of the data measurement that corresponds to the new candidate observation, and $c_{n+1}$ is the vector whose components are the covariance terms of this measurement. Using the formula for the inverse of a block matrix (G. H. Golub and C. F. Van Loan. *Matrix Computations*. Johns Hopkins, Baltimore, Md., USA, 1996), $$(C_D)_{n+1}^{-1} = \tag{39}$$

$$\begin{bmatrix} [(C_D)_n - \sigma_{n+1}^2 c_{n+1} c_{n+1}^T +]^{-1} & -(C_D)_n^{-1} c_{n+1} [\sigma_{n+1}^2 - c_{n+1}^T (C_D)_n^{-1} c_{n+1}]^{-1} \\ -\sigma_{n+1}^{-2} c_{n+1}^T [(C_D)_n - \sigma_{n+1}^2 c_{n+1} c_{n+1}^T]^{-1} & [\sigma_{n+1}^2 - c_{n+1}^T (C_D)_n^{-1} c_{n+1}]^{-1} \end{bmatrix}.$$

Substituting (39) into (8) yields $$C_{n+1}^{-1} = G_n^T [(C_d)_n - \sigma_{n+1}^2 c_{n+1} c_{n+1}^T]^{-1} G_n - \tag{40}$$

$$\sigma_{n+1}^{-2} g_{n+1} c_{n+1}^T [(C_D)_n - \sigma_{n+1}^2 c_{n+1} c_{n+1}^T]^{-1} G_n -$$

$$[\sigma_{n+1}^2 - c_{n+1}^T (C_d)_n^{-1} c_{n+1}]^{-1} G_n^T (C_D)_n^{-1} c_{n+1} g_{n+1}^T +$$

$$[\sigma_{n+1}^2 - c_{n+1}^T (C_d)_n^{-1} c_{n+1}]^{-1} g_{n+1} g_{n+1}^T + C^{-1}.$$

Upon using the Sherman-Morrison formula described by Golub and Loan, Eq. (40) reduces to $$C_{n+1}^{-1} = A + hg_{n+1}^T + g_{n+1}k^T, \text{ wherein} \tag{41}$$

$$A \equiv C_n^{-1} + G_n^T B G_n, \tag{42}$$

$$B \equiv \frac{\sigma_{n+1}^2 (C_D)_n^{-1} c_{n+1} c_{n+1}^T (C_D)_n^{-1}}{1 - \sigma_{n+1}^2 c_{n+1}^T (C_d)_n^{-1} c_{n+1}}, \tag{43}$$

$$h \equiv [\sigma_{n+1}^2 - c_{n+1}^T (C_D)_n^{-1} c_{n+1}]^{-1} [g_{n+1} - G_n^T (C_D)_n^{-1} c_{n+1}] \text{ and} \tag{44}$$

$$k^T \equiv -\sigma_{n+1}^{-2} c_{n+1}^T \left[ (C_D)_n^{-1} + \frac{\sigma_{n+1}^2 (C_d)_n^{-1} c_{n+1} c_{n+1}^T (C_D)_n^{-1}}{1 - \sigma_{n+1}^2 c_{n+1}^T (C_D)_n^{-1} c_{n+1}} \right] G_n. \tag{45}$$

The repeated use of the matrix determinant lemma (D. A. Harville. *Matrix Algebra from a Statistician's Perspective*. Springer-Verlag, New York, N.Y., USA, 1997) and the Sherman-Morrison formula yields for Eq. 41

$$|C_{n+1}^{-1}| = |A|(1 + g_{n+1}^T A^{-1} h) \left[ 1 + k^T \left( A^{-1} - \frac{A^{-1} h g_{n+1}^T A^{-1}}{1 + g_{n+1}^T A^{-1} h} \right) g_{n+1} \right]. \tag{46}$$

Note that the Woodbury formula described by Harville, a rank-k-generalization of the Sherman-Morrison result, could be used to calculate $A^{-1}$. This yields $$A^{-1} = (C_n^{-1} = G_n^T B G_n)^{-1} = C_n - C_n G_n^T (B^{-1} + G_n C_n G_n^T)^{-1} G_n C_n. \tag{37}$$

However, from a computational point of view this is not very helpful as one would still have to calculate the inverse of two large matrices. To calculate $|A|$ the generalized matrix determinant lemma can be used, which yields $$|A| = |C_n^{-1} + G_n^T B G_n| = |C_n^{-1}||I + B G_n C_n G_n^T|. \tag{48}$$

wherein I is the identity matrix. With these results, Eqs. (46) and (48), the objective function can be expressed as $$\frac{|C_{n+1}^{-1}|}{|C_n^{-1}|} = \tag{49}$$

-continued $$(1 + g_{n+1}^T A^{-1} h)|1 + BG_n C_n G_n^T| \left[ 1 + k^T \left( A^{-1} - \frac{A^{-1} h g_{n+1}^T A^{-1}}{1 + g_{n+1}^T A^{-1} h} \right) g_{n+1} \right],$$

wherein A is given by Eq. 42, B is given by Eq. 43, h is given by Eq. 44, and k is given by Eq. 45. It can be shown that when the data covariance matrix is diagonal, i.e., when $c_{n+1}=0$, Eq. 49 reduces to Eq. 16. This result, Eq. 49, would clearly be computationally expensive to implement, but may be an acceptable cost when the data measurements are not independent from one another.

Figure 4A:
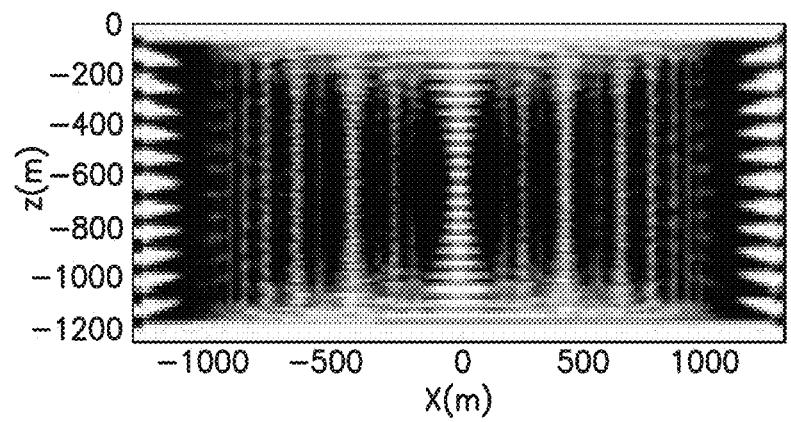
FIG. 4a illustrates the set of all rays from the depicted potential source-receiver pairs.
Figure 4B:
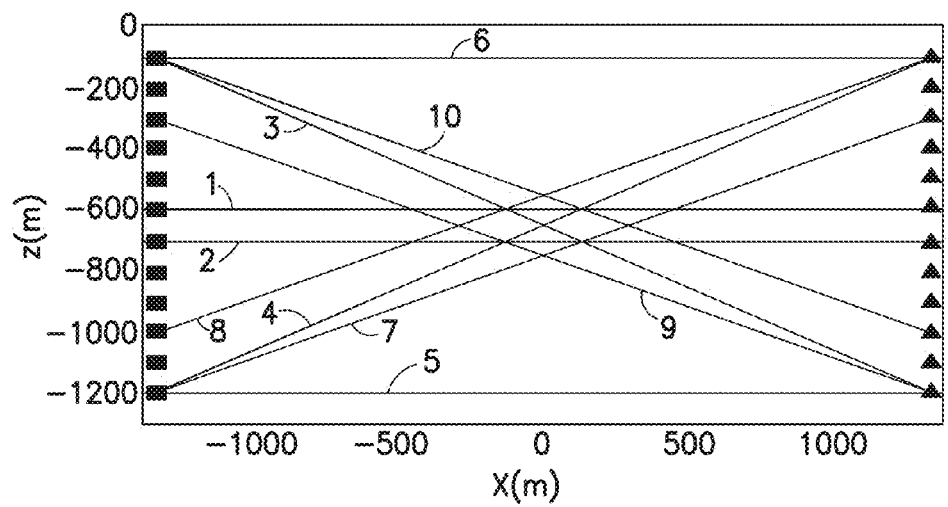
FIG. 4b illustrates a survey designed by a non-Bayesian algorithm where noise is neglected.
Figure 5A:
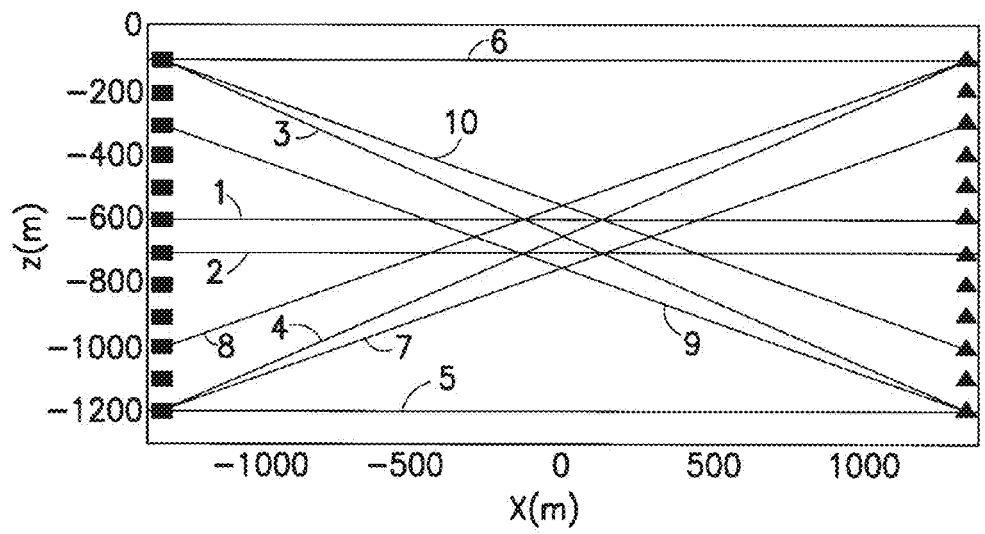
FIG. 5a illustrates a survey designed by a Bayesian algorithm where both noise and prior model uncertainty are neglected.
Figure 5B:
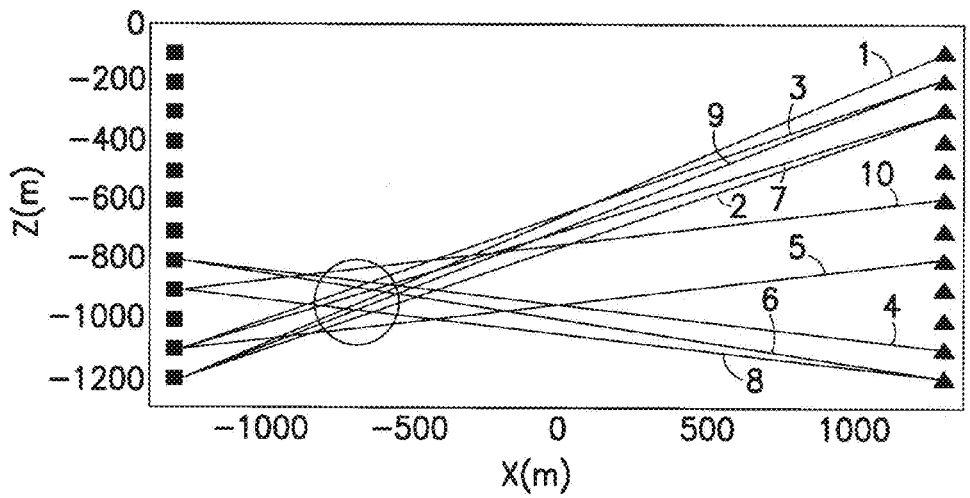
FIG. 5b illustrates a survey designed by the Bayesian algorithm using the same noise model as above, but with the uncorrelated prior model covariance having a standard deviation within the disk being 10 times larger than in the other portion of the model.
Figure 5C:
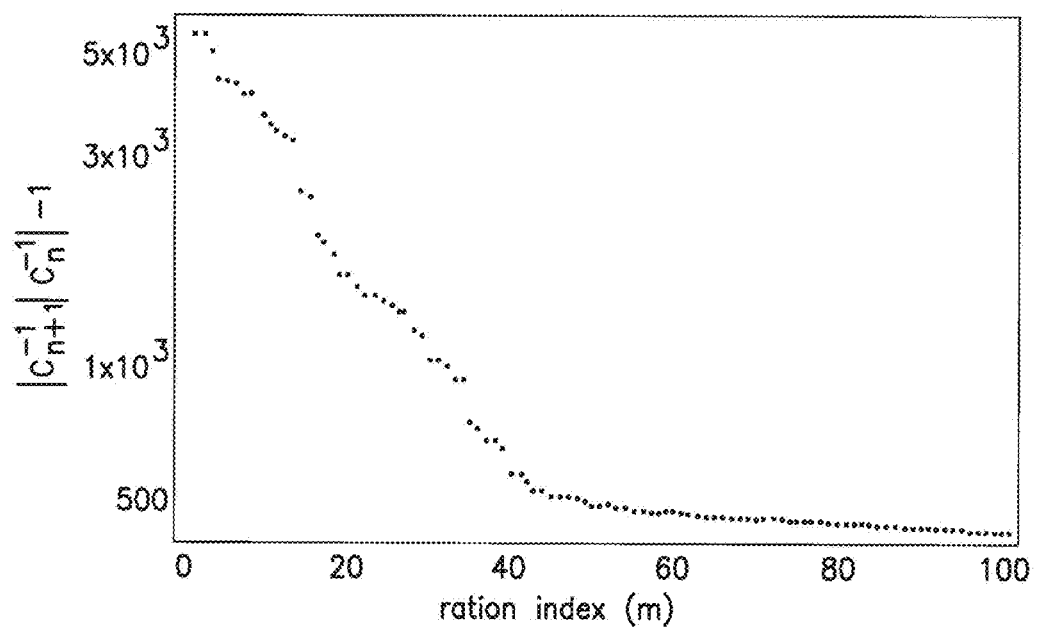
FIG. 5c is a plot of the convergence of $|C_{n+1}-1|/|C_{n-1}|-1$ versus the iteration index n for the solution shown in FIG. 5b.

FIGS. 4a-4b, 5a-5c, and 6a-6c illustrate the benefits of accounting for prior information in optimal experimental design. More particularly, the illustrated examples show that while the non-Bayesian and the Bayesian approaches yield the same survey design when no prior model information is available and when observation noise is ignored, the Bayesian algorithm guides the design process to primarily focus on areas of higher model uncertainty. FIG. 4a shows the set of all rays from potential source-receiver pairs in a homogenous model for which compression wave velocity is uniformly 2400 m/s. Two vertical boreholes are positioned on the left- and right-sides of the model. Twelve seismic uniformly-spaced sources are placed in the left borehole, and twelve uniformly-spaced seismic receivers are placed in the right borehole. The measurement is the compressional-wave traveltime between each source-receiver pair. Consequently, a total of 12×12 potential source-receiver pairs are considered in this experimental design problem. FIGS. 4b and 5a illustrate survey designs from non-Bayesian and Bayesian algorithms, respectively, where the Bayesian design neglects measurement noise and model uncertainty. In the Bayesian algorithm these can be neglected by setting $C_D \propto I$ and $C \propto I$. The rays are numbered in order of their selection by the optimization algorithms. Note that the two designs are identical. FIG. 5b illustrates the result of modifying the Bayesian design by using the same noise model as in the previous designs, but with the uncorrelated prior model covariance having a standard deviation within the a disk 10 times larger than in the other portion of the model. Note that the Bayesian algorithm responds to the locally larger uncertainty by concentrating more rays within this region of uncertainty in order to reduce the uncertainty toward the background level. FIG. 5c is a plot of the convergence of $|C_{n+1}^{-1}|/|C_n^{-1}|-1$ versus n. Note that initial convergence is rapid, while the overall convergence is monotonic.

Figure 6A:
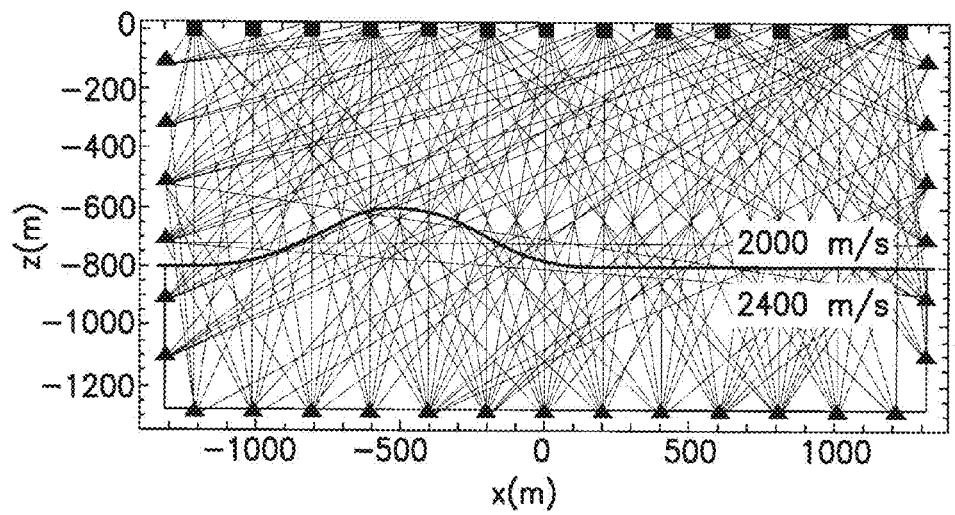
FIG. 6a illustrates the set of all (successful) rays from the depicted potential source-receiver pairs.
Figure 6B:
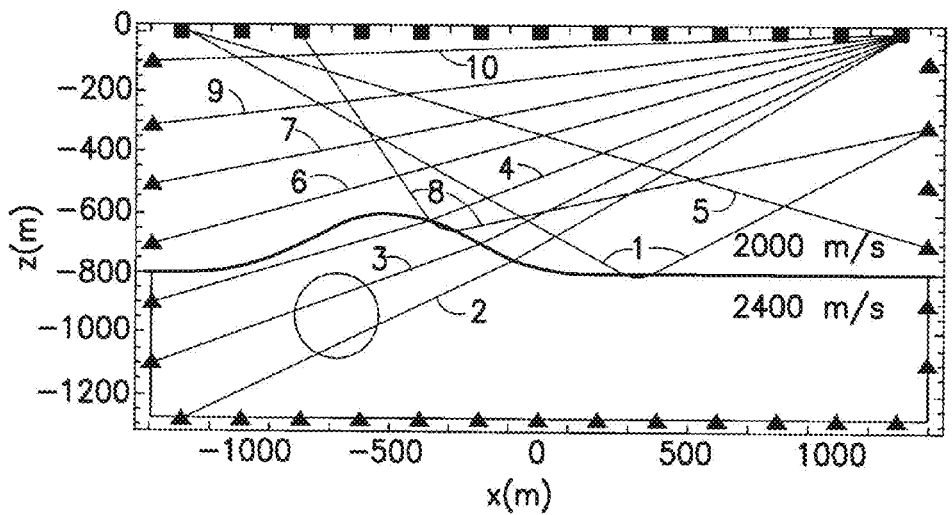
FIG. 6b illustrates a survey designed by a non-Bayesian algorithm.
Figure 6C:
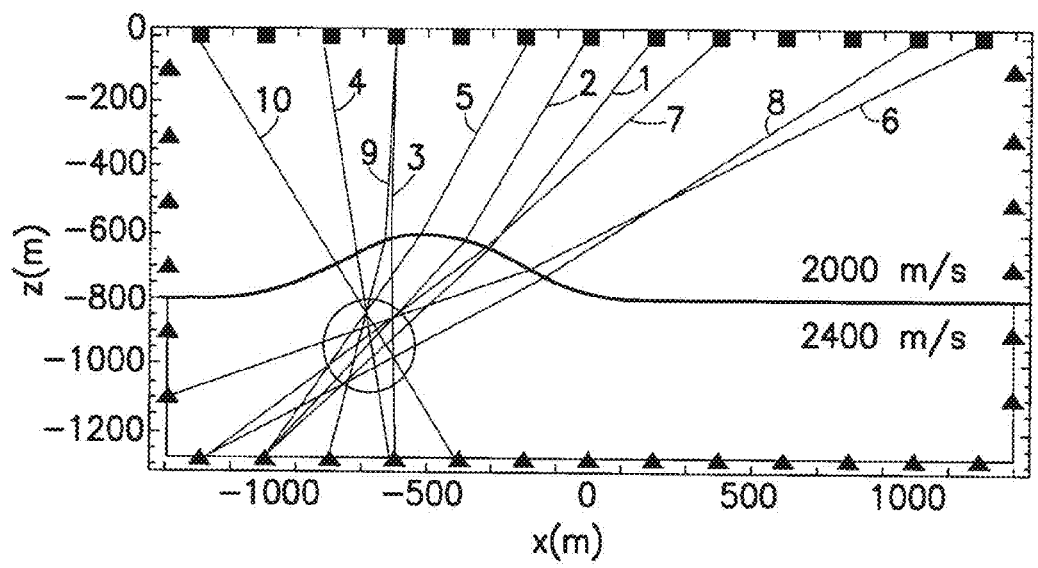
FIG. 6c illustrates a survey designed by the Bayesian algorithm using the same noise model as above, but with the uncorrelated prior model covariance having a standard deviation within the disk being 10 times larger than in the other portion of the model.

FIGS. 6a through 6c illustrate comparative results with a heterogeneous model. Geometry of the velocity grid is the same as that of the homogeneous model described above, but the velocities and the distribution of the sources and receivers is different. The uniformly-spaced sources are now placed on the surface, and the receivers are distributed in two boreholes, one of which is vertical, the other of which is deviated. Hence, a total of 325 source-receiver pairs are considered. A simple two-layer inhomogeneous velocity model is considered. It consists of an upper layer in which the velocity of the seismic waves is 2000 m/s and a lower layer in which the velocity is 2400 m/s. The two layers are separated by an interface with a Gaussian hump. Out of the 325 rays, the ray tracer failed to trace 28% of the rays. The reason behind this failure is that they lie in the shadow zone, making these failed rays poor candidates for observation stations. FIGS. 6b and 6c show the first ten observation stations in the survey designs created by the non-Bayesian and Bayesian algorithms, respectively. The Bayesian algorithm uses an uncorrelated prior model covariance in which the standard deviation within the disk is 10 times larger than in the other portion of the model. Note that the Bayesian design yields a survey design that concentrates on those areas with higher uncertainty, even in the presence of inhomogeneities.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

We claim:

1. A method for characterizing a subterranean formation, the method comprising:
    selecting model parameters of a linear model that predicts physical observations of the formation;
    determining a prior model probability density relating to the model parameters of the linear model, the prior model probability density including (i) a mean prior model, and (ii) a first covariance matrix describing uncertainty around the mean prior model;
    determining a second covariance matrix relating to the model parameters of the linear model and describing uncertainty around anticipated observation noise; and
    iteratively adding a select candidate physical observation to a set of physical observations of the formation as predicted by the linear model based on D-optimality augmented criteria using a processor, which involves determining a sensitivity matrix for the model parameters and the set of physical observations based on a determinant derived from the first covariance matrix and components of the second covariance matrix that are associated with the select candidate physical observation; and
    configuring survey equipment that characterizes the formation using the set of physical observations.

2. The method of claim 1, further comprising assigning the physical model parameters to a probability density function.

3. The method of claim 1, wherein each physical observation is associated with multiple measurements.

4. The method of claim 3, further comprising processing k measurements at a time for a physical observation with k associated measurements.

5. The method of claim 1, wherein the determinant is further derived from components of the second covariance matrix that are associated with a number of base physical observations.

6. The method of claim 1, wherein at least one select candidate physical observation is iteratively added to the set of physical observations of the formation until a stop condition is satisfied.

7. The method of claim 1, wherein the survey equipment comprises an array of seismic receivers.

8. Apparatus for characterizing a subterranean formation, the apparatus comprising:
    a memory storing comprising physical model parameters of a linear model that predicts physical observations of the formation; and
    a processor which is configured to:
        determine a prior model probability density relating to the model parameters of the linear model, the prior model probability density including (i) a mean prior model, and (ii) a first covariance matrix describing uncertainty around the mean prior model,
        determine a second covariance matrix relating to the model parameters of the linear model and describing uncertainty around anticipated observation noise, and
        iteratively add a select candidate physical observation to a set of physical observations of the formation as predicted by the linear model based on D-optimality augmented criteria, which involves determining a sensitivity matrix for the model parameters and the set of physical observations based on a determinant derived from the first covariance matrix and components of the second covariance matrix that are associated with the select candidate physical observation;
    wherein the set of physical observations are used to configure survey equipment that characterizes the formation.

9. The apparatus of claim 8, wherein the determinant is further derived from components of the second covariance matrix that are associated with a number of base physical observations.

10. The apparatus of claim 8, wherein at least one select candidate physical observation is iteratively added to the set of physical observations of the formation until a stop condition is satisfied.

11. The apparatus of claim 10, wherein the stop condition involves at least one of:
    i) a condition related to the determinant, ii) a condition related to the number of candidate physical observations added to the set of physical observations and to the total number of model parameters of the linear model, and iii) a condition related to the number of candidate physical observations added to the set of physical observations and a predefined maximum number.

12. The apparatus of claim 8, wherein the survey equipment comprises an array of seismic receivers.

13. The method of claim 6, wherein the stop condition involves at least one of:

i) a condition related to the determinant, ii) a condition related to the number of candidate physical observations added to the set of physical observations and to the total number of model parameters of the linear model, and iii) a condition related to the number of candidate physical observations added to the set of physical observations and a predefined maximum number.

* * * * *